US005697052A

United States Patent [19]
Treatch

[11] Patent Number: 5,697,052
[45] Date of Patent: Dec. 9, 1997

[54] CELLULAR SPECIALIZED MOBILE RADIO SYSTEM

[76] Inventor: James E. Treatch, 4312 Brooktree La., Dallas, Tex. 75287

[21] Appl. No.: 498,510

[22] Filed: Jul. 5, 1995

[51] Int. Cl.⁶ ............................................. H04B 7/14
[52] U.S. Cl. ........................ 455/20; 455/9; 455/33.1; 455/56.1; 379/60
[58] Field of Search .................... 455/20, 9, 15, 455/16, 17, 32.1, 33.1, 33.3, 34.1, 56.1, 164.1, 164.2, 165.1, 33.4, 77, 76, 11.1, 22, 13.3; 379/59, 60; 342/457, 372, 428, 433

[56] References Cited

U.S. PATENT DOCUMENTS

| | | | |
|---|---|---|---|
| 4,039,947 | 8/1977 | Miedema | 455/8 |
| 4,152,647 | 5/1979 | Gladden et al. | 455/11.1 |
| 4,207,522 | 6/1980 | Thornton et al. | 455/77 |
| 4,654,879 | 3/1987 | Goldman et al. | 455/33.1 |
| 4,794,635 | 12/1988 | Hess | 379/60 |
| 4,802,235 | 1/1989 | Treatch | 455/76 |
| 4,941,200 | 7/1990 | Leslie et al. | 455/17 |
| 5,006,857 | 4/1991 | DeHart | 343/700 MS |
| 5,034,993 | 7/1991 | Sasuta et al. | 455/11 |
| 5,095,531 | 3/1992 | Ito | 455/33.1 |
| 5,115,514 | 5/1992 | Leslie | 455/9 |
| 5,146,186 | 9/1992 | Vella | 331/16 |
| 5,157,709 | 10/1992 | Ohteru | 379/58 |
| 5,218,354 | 6/1993 | Hess | 340/826 |
| 5,274,838 | 12/1993 | Childress et al. | 455/9 |
| 5,437,055 | 7/1995 | Wheatley | 455/33.3 |
| 5,485,631 | 1/1996 | Bruckert | 455/33.3 |
| 5,488,737 | 1/1996 | Harbin et al. | 455/33.1 |
| 5,596,333 | 1/1997 | Bruckert | 342/457 |

*Primary Examiner*—Reinhard J. Eisenzopf
*Assistant Examiner*—Lee Nguyen
*Attorney, Agent, or Firm*—Paul F. Wille

[57] ABSTRACT

An SMR repeater is made agile by adding a microprocessor controlled frequency selection circuit to enable the repeater to operate on any one of several available frequencies in a band. For dispatch service, the output of the repeater is switched to a power amplifier feeding an omni-directional antenna. The repeater scans several frequencies sequentially. If a signal is detected, scanning is halted to provide repeater service, after which scanning is resumed. The frequency agile repeater is coupled to an antenna system having a narrow beam which can be steered electronically. A control computer scans the azimuth of the beam. The computer divides a service area into a plurality of cells extending radially from the antenna system and assigns channels as needed to service a subscriber. More than one cell can be on the same frequency without interference. The microprocessor includes a table in memory of call signs corresponding to particular transmission frequencies and causes the repeater to transmit the appropriate call sign when transmitting at a particular frequency.

18 Claims, 3 Drawing Sheets

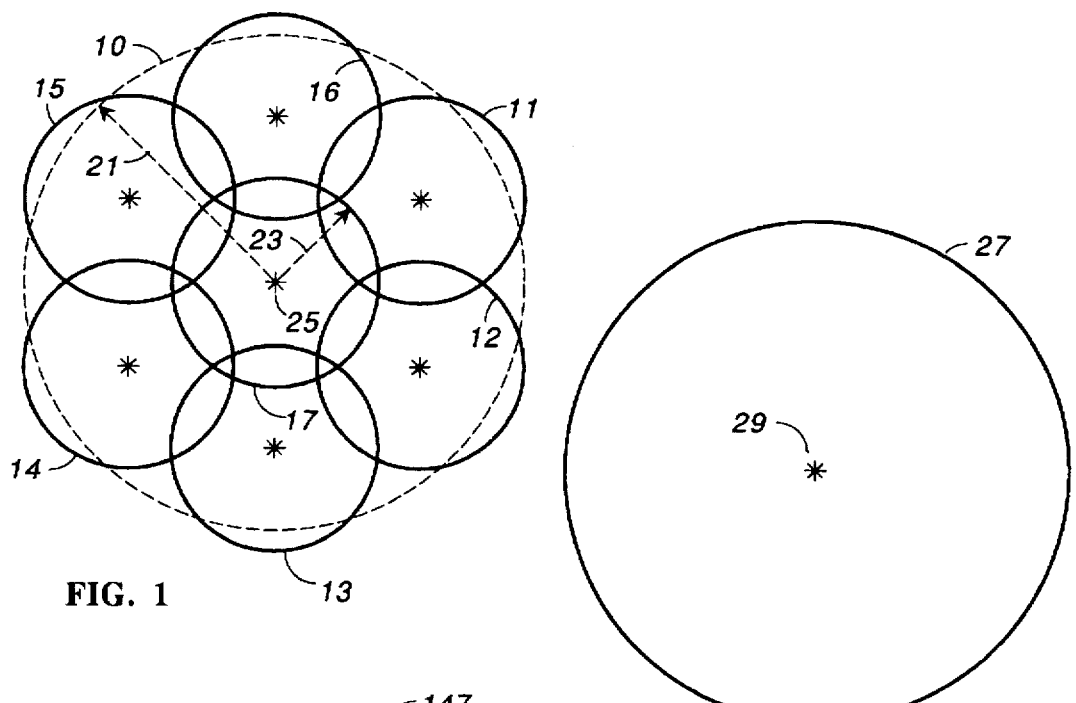
FIG. 1
FIG. 2
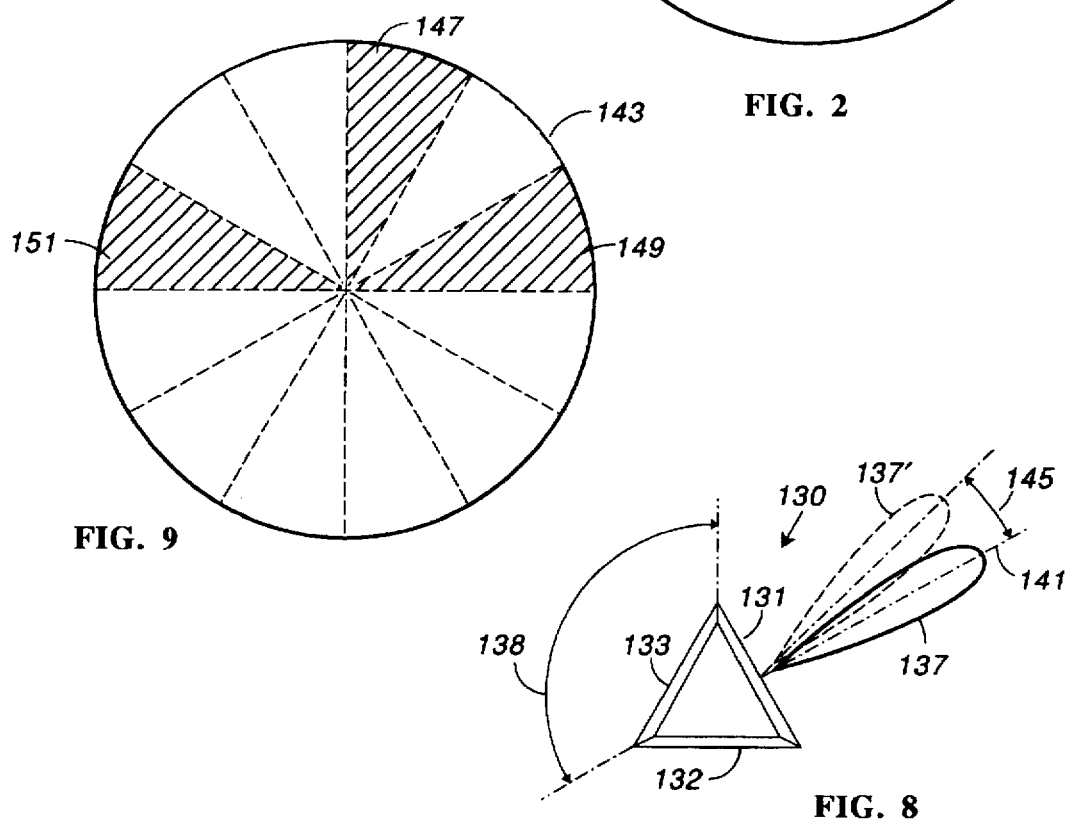
FIG. 9
FIG. 8

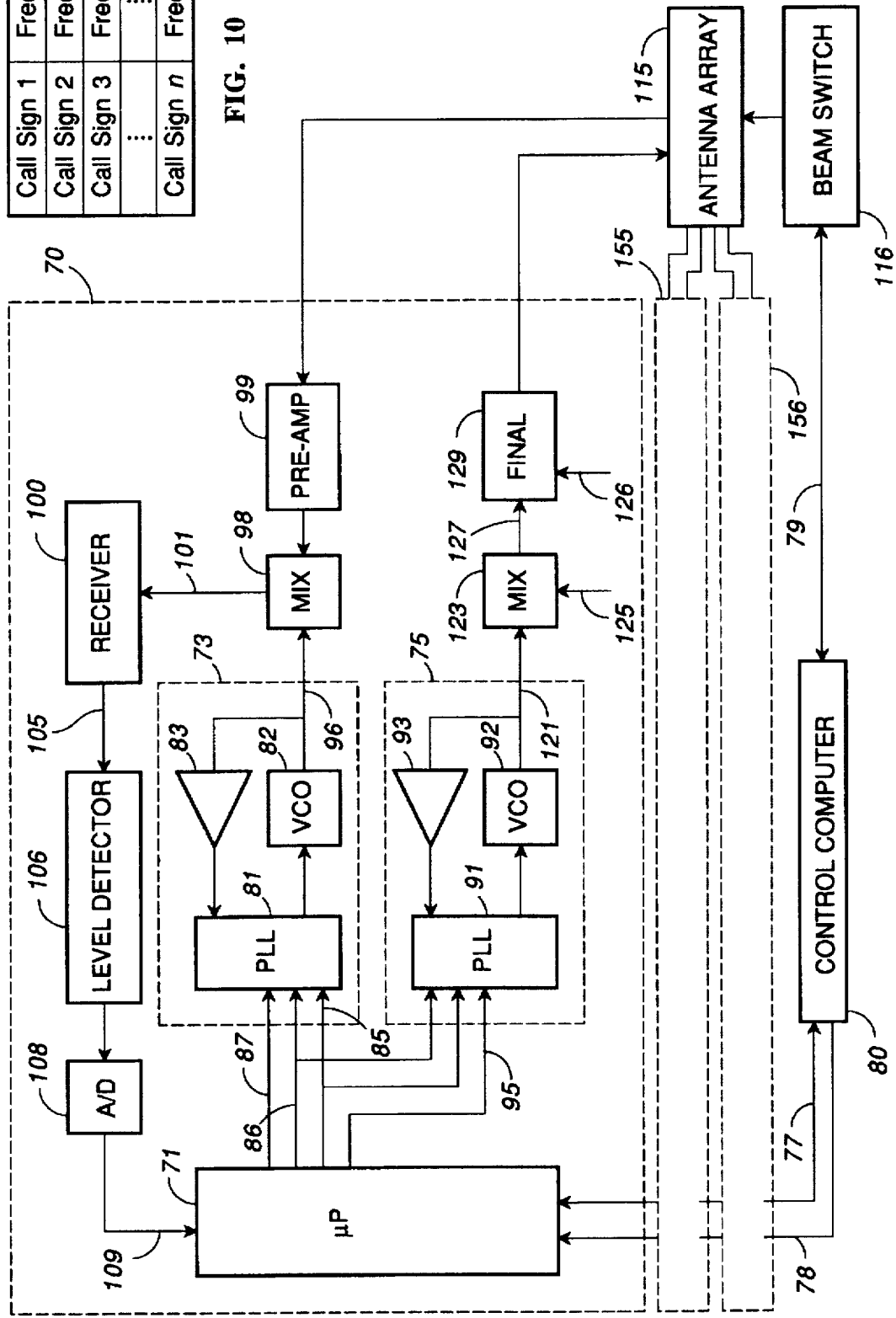

CELLULAR SPECIALIZED MOBILE RADIO SYSTEM

BACKGROUND OF THE INVENTION

This invention relates to a repeater system for enabling mobile or portable radio stations to communicate with each other and, in particular, to a specialized mobile radio system that operates like a cellular system.

A repeater is a receiver-transmitter combination for receiving a signal at one frequency and re-transmitting the signal on a second frequency. Depending upon application, the transmitted frequency may be relatively close to the received frequency, e.g. 600 khz., or greatly displaced from the received signal. Depending upon application, frequency, and government regulation, the transmitter in a repeater may be relatively powerful, hundreds of watts, or may be rated at just a few watts.

Commercial two-way radio communication has evolved into two different techniques for mobile operation, cellular and specialized mobile radio or dispatch service. Cellular systems use several repeaters dispersed in a geographic area and operating at low power to keep propagation relatively short, e.g. within a radius of less than ten miles. The local area covered by each repeater overlaps the local areas covered by neighboring repeaters, forming overlapping "cells" of coverage. A subscriber traveling from one cell to another cell is automatically switched from one repeater to another by a computer coupled to the repeaters by microwave link, optical fiber, or wire.

Because propagation is short, the frequencies used by one repeater can be used by a non-neighboring repeater without interference. Because frequencies can be re-used, more subscribers can be served in a given geographic area. The frequency spectrum is allocated by government regulation and only a limited number of frequencies or channels are available. Thus, re-using assigned frequencies in a geographic area provides much more efficient use of a limited resource.

Specialized mobile radio (SMR) uses a powerful repeater, usually located at the highest available elevation in a geographic area. The repeater is coupled to an omni-directional antenna to cover the entire geographic area, enabling dispatchers to communicate with a fleet of vehicles in the geographic area and enabling the vehicles to communicate with each other. SMR repeaters are adjustable in frequency but operate at a fixed frequency. A problem with SMR repeaters is that the frequency setting mechanism, typically a small cluster of switches ("DIP" switches), requires that the repeater be turned off, the frequency set, and the repeater turned on. Even if the switches can be set while the repeater is on, the computer in the repeater must be reset in order to read the new settings. Thus, resetting the frequency of a repeater involves significant down time.

There are several differences between cellular radio and SMR. A first difference is that an SMR repeater operates on a single frequency, i.e. there can be only one user. Another difference is that an SMR repeater operates "half duplex," which means that a user can transmit or receive but not both, i.e. only one party to a conversation can talk at a time and everyone else on that frequency or channel must listen. There is often a busy condition where one user occupies a channel needed by another user. Trunked specialized mobile radio (TSMR) improves service by using a computer to switch users among several channels, typically five to twenty, enabling more conversations to take place with fewer busy conditions.

A problem with cellular systems is the large investment in capital equipment because of the number of cells required to cover a geographic area. Each cell must have a repeater, an antenna, a favorable site for locating the antenna, electrical power, licenses, and other expenses including the cost of the control computer and the communication links to each repeater. On the other hand, SMR has a lower capital investment but serves a limited number of users compared to cellular radio.

U.S. Pat. No. 4,802,235 (Treatch) describes a mobile transceiver which can be used for either cellular operation or trunked dispatch operation. A logic controlled frequency synthesizer enables the transceiver to operate with either a 25 kc. or a 30 kc. channel separation, as required for the different modes of operation. The patent relates to a mobile transceiver, not to a repeater, and does not address the problem of increasing the capacity of SMR repeater systems.

In view of the foregoing, it is therefore an object of the invention to increase the number of subscribers that can be served by an SMR system.

Another object of the invention is to provide a low cost SMR system that can serve a large number of users.

A further object of the invention is to operate an SMR system like a cellular system.

Another object of the invention is to enable a given frequency or channel to be used simultaneously for separate transmissions in a give geographic area without conflict or interference.

A further object of the invention is to add multi-user telephone capability to an SMR system.

SUMMARY OF THE INVENTION

The foregoing objects are achieved by this invention, in which an SMR repeater is made frequency agile by adding a computer controlled frequency selection circuit to enable the repeater to operate on any one of several available frequencies in a band. For dispatch service, the output of the repeater is switched to a power amplifier feeding an omni-directional antenna. The repeater can scan a subset of the available frequencies sequentially. If a signal is detected, scanning is halted to provide repeater service, after which scanning is resumed.

In accordance with another aspect of the invention, a frequency agile repeater is coupled to an antenna system having a narrow beam which can be steered electronically. A control computer scans the azimuth of the beam. The computer divides a service area into a plurality of cells extending radially from the antenna and assigns channels as needed to service a subscriber. More than one cell can be on the same channel at the same time without interference. An interface or "patch" to telephones can be provided to further enhance the performance of the system.

BRIEF DESCRIPTION OF THE DRAWINGS

A more complete understanding of the invention can be obtained by considering the following detailed description in conjunction with the accompanying drawings, in which:

FIG. 1 illustrates the coverage provided by a cellular radio system;

FIG. 2 illustrates the coverage provided by a specialized mobile radio system;

FIG. 7 is a schematic of a repeater constructed in accordance with the invention;

FIG. 8 illustrates an antenna having a rotatable beam;

FIG. 9 illustrates the cells in a geographic area served by a repeater system constructed in accordance with the invention; and FIG. 10 illustrates a table stored in RAM or ROM and accessed by a frequency controlling microprocessor.

DETAILED DESCRIPTION OF THE INVENTION

Figure 3:
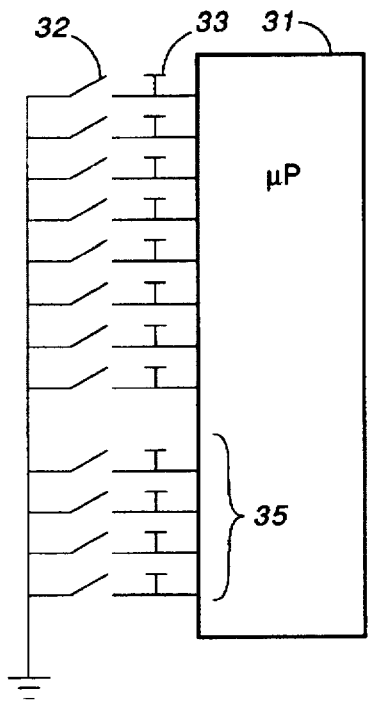
FIG. 3 is a schematic of the frequency control circuitry in a repeater of the prior art.

FIG. 1 illustrates the coverage of geographic area 10 by a plurality of cellular repeaters. In particular, circles 11, 12, 13, 14, 15, 16, and 17 approximately cover the area indicated by circle 10 and represents the propagation distance, as indicated by radius 23, for a transmitter located at the center of a cell, such as transmitter 25 at the center of circle 17. In typical cellular telephone systems, radius 23 is equal to ten miles or less.

The number of cells and their placement are determined by the actual shape of the geographic area in which services is desired. Assuming a circular geographic area, as represented by circle 10, seven overlapping cells, each having a radius of about eight miles, could cover a geographic area having a radius of approximately twenty miles, as indicated by radius 21. A frequency or channel in use in one cell could not be used in an adjoining cell but could be used in a non adjoining cell in the same area. For example, a channel in use in circle 16 could not be used in circle 17 but could be used in circles 12, 13, or 14. Thus, a large number of subscribers can be served without interference.

FIG. 2 illustrates the coverage provided by a specialized mobile radio system in which circle 27 indicates the geographic area served by transmitter 29 located at the center of circle 27. A single subscriber within geographic area 27 ties up the entire area each time the repeater at location 29 is accessed. Cellular repeaters (FIG. 1) typically operate on different subsets of the available channels and the repeaters are coupled to a control computer for assigning the subsets of frequencies. Each centrally located site, such as site 25, includes a plurality of repeaters, one for each service channel in the subset. The control computer also selects the channel within each subset.

An SMR repeater servicing the geographic area represented by circle 27 is similarly configured, that the repeater is capable of operating on one of a plurality of frequencies in a given band. FIG. 3 illustrates a mechanism for setting the operating frequency of a commercially available repeater. Central processing unit 31 has a plurality of parallel inputs. Each input is coupled to ground through a switch, such as switch 32, and is coupled to a DC supply voltage through a load resistor, represented by bar 33. The particular frequency in a band is chosen by the pattern of open and closed switches. The group of switches indicated by reference number 35 selects the subset of frequencies available within a repeater. Using a predefined coding pattern, one sets the frequency of each repeater to avoid conflict with other repeaters.

Figure 4:
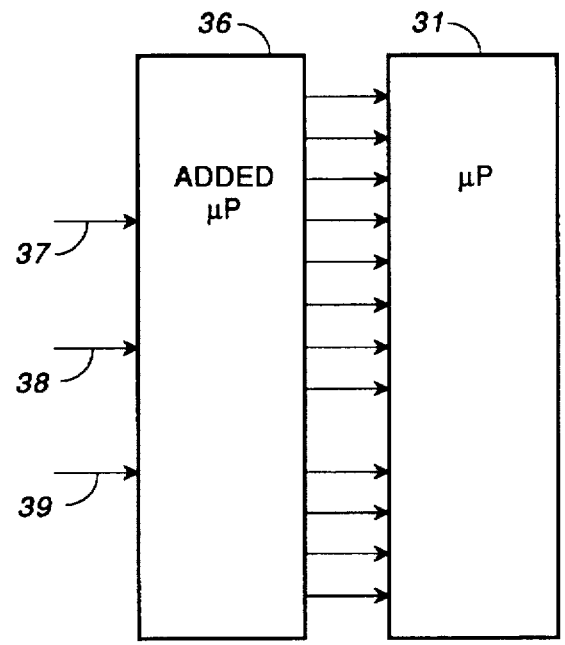
FIG. 4 is a schematic of the frequency control circuitry in the repeater illustrated in FIG. 3 modified in accordance with the invention.

In accordance with one aspect of the invention, a repeater for a specialized mobile radio system is modified as illustrated in FIG. 4 to provide a scanning repeater or a frequency agile repeater. In particular, a second central processing unit is substituted for the plurality of switches and is controlled by external control lines to the repeater. Microprocessor 31 is the existing microprocessor in a repeater and microprocessor 36 is added to the circuit, providing the frequency encoding data instead of the switches illustrated in FIG. 3. Line 37 is a serial data line, such as an RS232 line, for transferring control information to microprocessor 36 from a remote location. Input line 38 is a repeater network data link (RNDL) which enables a repeater to share a site with other repeaters. Line 39 is an antenna network data link (ANDL), which enables the repeater to control more than one antenna.

Microprocessor 36 is programmed to scan pre-selected channels in a designated order. For example, microprocessor 36 is programmed to check a plurality of channels alternately with channel one. This enables the repeater to monitor a "home" channel for activity while scanning a subset of all possible channels.

Figure 5:
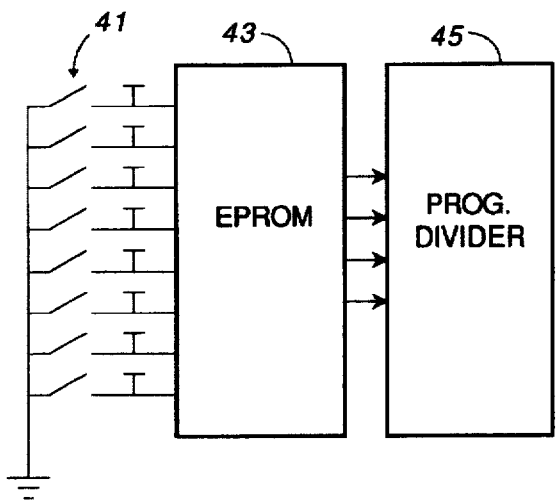
FIG. 5 is a schematic of the frequency control circuitry in a repeater of the prior art.

A number of commercially available repeaters can be modified in accordance with the invention to provide the scanning or the frequency agility functions. For example, FIG. 5 illustrates the frequency control portion of another commercially available repeater. Input switches 41 are coupled to the address inputs of EPROM 43. The data outputs from EPROM 43 are coupled to programmable divider 45. Programmable divider 45 is part of a phase locked loop circuit for controlling the operating frequency of a repeater.

Figure 6:
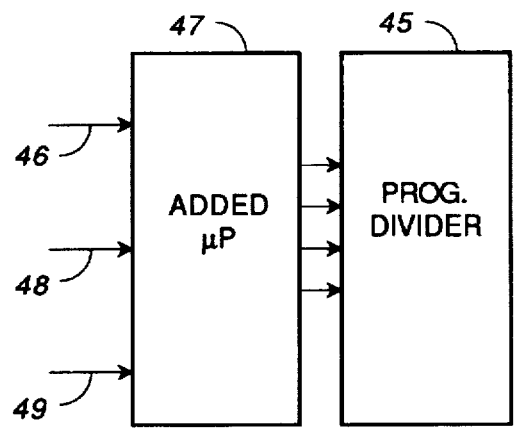
FIG. 6 is a schematic of the frequency control circuitry in a repeater illustrated in FIG. 5 modified in accordance with the invention.

As illustrated in FIG. 6, microprocessor 47 is substituted for switches 41 to provide control data to programmable divider 45. Microprocessor 47 includes RS232 input 46, RNDL input 48 and ANDL input 49, which enable the microprocessor to be controlled remotely and to be trunked with other repeaters. Other commercially available repeaters can be similarly modified in that a programmed microprocessor is substituted for switches or jumpers in the frequency determining portion of the repeater. Although any suitable microprocessor can be used, it is preferred that the added microprocessor be a single chip microcontroller in order to minimize the parts count of the modification. One microcontroller that has been found suitable is an MC68HC711E9 microcontroller as sold by Motorola, Inc. This microcontroller includes EPROM, RAM, ROM, and programmable I/O lines.

In a preferred embodiment of the invention, the functions of microprocessor 45 and 47, or microprocessor 36 and 31, are combined in a single microprocessor. FIG. 7 illustrates a communication system including at least one repeater constructed in accordance with a preferred embodiment of the invention. In repeater 70, microprocessor 71 is coupled to frequency synthesizer 73 and to frequency synthesizer 75. Synthesizer 73 controls the received frequency of the repeater and synthesizer 75 determines the transmitted frequency of the repeater. The transmitted frequency is offset from the received frequency by a predetermined amount, depending upon the band being used. For example, in the 800 megahertz band, the transmission frequency is 45 megahertz above the received frequency.

Receive synthesizer 73 includes phased lock loop circuit 81, voltage controlled oscillator 82, and amplifier 83. Microprocessor 71 controls the frequency at which the loop locks by way of data line 85, clock line 86 and receive enable line 87. Similarly, transmit synthesizer 75 includes phase lock loop 91, voltage controlled oscillator 92, and amplifier 93. Synthesizer 75 is controlled by data line 85, clock line 86 and transmission enable line 95.

Output 96 from synthesizer 73 is coupled as one input to mixer 98. A second input to mixer 98 is coupled to pre-amp 99, which is coupled to antenna array 115 and which includes suitable filters, amplifiers, and impedance matching networks. Output 101 from mixer 98 is coupled to receiver 100 for further amplification, filtering, and detection. Either voice or data or both voice and data can be transmitted and received.

Line 77 is a serial data line, such as an RS232 line, for transferring data between microprocessor 71 and control computer 80. Repeaters 155 and 156 are also coupled to computer 80 by a serial link. Input line 78 is a repeater network data link between computer 80 and each of the repeaters at the site. Line 79 is an antenna network data link for controlling antenna selection and azimuth by way of beam switch 116.

A voltage indicative of signal strength (the average amplitude of a received signal) is provided by receiver 100 on line 105 to level detector 106. In its simplest form, level detector 106 is a capacitor for smoothing the voltage indicative of signal strength. Other circuits, e.g. threshold sensing circuits, can be included in level detector 106. The output from level-detector 106 is converted into a digital signal by A/D converter 108. The output of A/D converter is coupled to input 109 of microprocessor 71. The amplitude information is coupled by microprocessor 71 to the control computer for steering the beam in antenna array 115 by way of beam switch circuitry 116. For example, repeater 70 tracks a vehicle moving from one cell to another by monitoring the amplitude of the received signal and briefly switching the beam position to determine if the signal level decreases or increases, thereby selecting the appropriate azimuth for the beam to maintain contact with a subscriber.

The output from frequency synthesizer 75 is coupled by line 121 to one input of mixer 123. Input 125 to mixer 123 is coupled to a stable local oscillator for producing an appropriate frequency on output line 127. Output line 127 is coupled to final amplifier 129, which couples the frequency determining portion of the repeater to antenna array 115 and includes an amplifier, filter, and matching network (not shown). Final amplifier 129 includes gain control input 126, which can be coupled to microprocessor 71 or to a control computer for adjusting the output power of repeater 70.

As illustrated in FIG. 8, antenna array 115 preferably includes three steerable arrays 131, 132, and 133 arranged along the sides of a triangle, preferably an equilateral triangle. Beam 137 from array 131 is represented somewhat ideally as a single lobe i.e. side lobes are not shown in FIG. 8. Beam 137 has a maximum amplitude in direction 141. In a preferred embodiment of the invention, each array has a gain of about 19 db. At this level, a ten watt output to the antenna produces almost one kilowatt of effective radiated power in the beam.

The azimuth of beam 137 can be changed, e.g. to position 137', by controlling the phase of the signals to the elements in array 131, as known in the antenna art. Because beam 137 is controlled by digital circuitry, the azimuth adjustment is incremental rather than continuous, although the increments can be made arbitrarily small. The increments should not be larger than the beam width. For example, as illustrated in FIG. 9, geographic area 143 is divided into twelve cells extending radially from an antenna at the center of the area, each cell having an angular width of about 30°. It is preferred that incremental change 145 in azimuth (FIG. 8) have maximum value of about 30° also. A 30° beam width is available at reasonable cost with existing technology. A narrower beam increases the number of cells proportionately. Arc 138 indicates the maximum azimuth which must be covered by a single array. In a preferred embodiment of the invention, this angle is about 120° and is well within the capability of an electronically steerable antenna.

In a mobile radio system having radially extending cells, non-adjoining cells are essentially isolated from each other and can operate at the same frequency. For example, in FIG. 9, a subscriber in cell 147 and a subscriber in cell 149 can operate at the same frequency without interference. The subscriber operating in cell 149 is serviced by repeater 70 and antenna system 130 and the subscriber in cell 147 is serviced by a second repeater, e.g. repeater 155, and by a second antenna system (not shown) located at the same site as antenna system 130. A subscriber in cell 151 is serviced by repeater 156 and by antenna system 130, using array 133. The selection of the antenna system, the array, and the beam direction is coordinated by computer 80. Thus, a specialized mobile radio system is provided wherein a single subscriber does not tie up the system covering a geographic area. Further, a large number of subscribers can be serviced on the same frequency without interference.

A repeater constructed in accordance with the invention can operate in several different modes. SMR wide area dispatch operation can be omnidirectional as in the prior art but base-to-mobile operations or telephone calls require the combination of a steerable beam antenna and radially extending cells in order to minimize interference and to increase the number of subscribes who can be on the air simultaneously. For wide area dispatch service, the output of a synthesizer is coupled to a power amplifier feeding an omni-directional antenna in antenna array 115.

In the steerable beam antenna mode, the beam is electronically rotated like an airport beacon. While the beam is rotating, the available channels are scanned for activity. A continuous data stream of signal level information and direction information is available to enable the control computer to select the repeater and the antenna most suited for the service. When a signal is detected, the frequency scanning and azimuth scanning are halted to provide repeater service and then resumed after a subscriber has been served.

Scan frequencies are programmed into the control computer, which defines scanning speed, repeat hold times before resuming scanning, the sequence of channels, and azimuth. By combining signal requests from subscribers with the status information in the control computer, one avoids interfering with other systems by knowing what channels are used in the other systems and including this data in the control computer. The control computer can skip the potentially conflicting channels or reduce power to avoid overlap of propagation.

FIG. 10 illustrates a lookup table in the memory of microprocessor 71 (FIG. 7). Each frequency or channel can have its own call sign and the call signs are transmitted automatically after a subscriber has been served or at timed intervals. The call sign can be transmitted in Morse code (CW) or as synthesized voice, depending upon available memory space. A CW call sign occupies a few bytes of memory whereas a voice call sign occupies tens of thousands of bytes. The system illustrated in FIG. 7 is configured in software by downloading channel, call sign, and other information from control computer 80 to microprocessor 71.

Having thus described the invention, it will be apparent to those of skill in the art that various modifications can be made within the scope of the invention. For example, although a circular service area is shown, it is understood that terrain, tall buildings, and government or military usage may result in a service area far more complicated than a circle and that two or more repeater sites may have to be used to cover a service area. In accordance with the invention, frequency agile SMR repeaters can be located at more than one site and coordinated by a single computer. Overlap between cells radiating from different repeater sites is minimized by reducing power for certain azimuths (along a line between the sites) at each repeater site. Thus, propagation is reduced and overlap and interference are minimized. Instead of monitoring a home channel, a first repeater at a site can be coupled to an omnidirectional antenna and scan all channels for activity in the area. When activity is found, a second receiver, set to the active channel, is coupled to a steerable array to locate and lock on to the subscriber. The first repeater can continue to scan the remaining channels for activity. Although an electronically rotatable antenna is preferred, a mechanically rotated antenna can be used instead.

What is claimed as the invention is:

1. A frequency agile repeater for specialized mobile radio service, said repeater comprising:

receiver for receiving a transmission at a first frequency;

transmitter for re-sending said transmission at a second frequency;

a frequency control circuit for producing a predetermined frequency, said frequency control circuit including a plurality of parallel input data lines and producing an output frequency corresponding to digital data on said input data lines; and a microprocessor having a plurality of parallel output data lines, wherein at least some of said parallel output data lines are coupled to the parallel input data lines of said frequency control circuit;

said microprocessor including a memory, wherein a table of available frequencies for transmission and reception is stored in said memory and said microprocessor causes said frequency control circuit to select one of said frequencies under software control.

2. The repeater as set forth in claim 1 wherein said microprocessor includes a repeater network data link for communicating with other repeaters.

3. The repeater as set forth in claim 1 wherein said frequency control circuit includes a programmable divider having a plurality of inputs, wherein said input data lines are coupled to the inputs of said programmable divider.

4. The repeater as set forth in claim 1 wherein said memory includes a table of call signs corresponding to said available frequencies and said microprocessor causes said repeater to automatically identify itself with one of said call signs when the corresponding frequency is selected for transmission.

5. The repeater as set forth in claim 1 wherein:

said input data lines define the available frequencies in a band;

said input data lines are divided between a first group and a second group;

the input data lines in said first group determine at least one set of frequencies; and the input data lines of said second group select individual frequencies from a set of frequencies selected by said first group.

6. The repeater as set forth in claim 5 wherein said microprocessor causes said frequency control circuit to scan through frequencies from more than one set of frequencies.

7. The repeater as set forth in claim 1 wherein said microprocessor is physically located in said repeater.

8. A specialized mobile radio system for providing both dispatch and cellular radio operations in a predetermined propagation area, said system comprising:

an antenna system having an electronically steerable, narrow beam;

at least one repeater coupled to said antenna system, said repeater operable in any one of a plurality of frequencies and capable of changing from one frequency to another frequency in a predetermined sequence;

a control computer coupled to said repeater and to said antenna for rotating the beam of said antenna and for scanning a plurality of frequencies to provide service in a plurality of cells extending radially from said antenna system.

9. The system as set forth in claim 8 wherein the beam width of said narrow beam and the angular width of said cells is approximately equal.

10. The system as set forth in claim 8 wherein said antenna system includes three steerable arrays arranged along the sides of a triangle.

11. The system as set forth in claim 10 wherein said triangle is equilateral.

12. The system as set forth in claim 8 wherein said repeater includes a microprocessor, a frequency synthesizer controlled by said microprocessor, and a data link coupling said microprocessor to said control computer.

13. The system as set forth in claim 12 wherein said repeater includes:

a receiver;

a level detector coupled to said receiver; and an analog-to-digital converter coupled to said level detector for converting voltages proportional to signal strength into digital data;

wherein said analog-to-digital converter is coupled to said microprocessor.

14. The system as set forth in claim 13 wherein said control computer adjusts the azimuth of said beam in accordance with the signal strength of a received signal.

15. The system as set forth in claim 8 wherein said repeater includes a frequency synthesizer and a data link coupling said control computer to said frequency synthesizer, wherein the frequency of each repeater is controlled by said control computer.

16. A specialized mobile radio system for providing both dispatch and cellular radio operations in a predetermined propagation area, said system comprising:

an antenna;

at least one repeater coupled to said antenna, said repeater operable in any one of a plurality of frequencies and capable of changing from one frequency to another frequency in a predetermined sequence;

said repeater including a microprocessor and a frequency synthesizer controlled by said microprocessor;

wherein said microprocessor includes a memory containing a table of frequencies and call signs, wherein a call sign is associated with a particular transmission frequency; and wherein said microprocessor causes said repeater to transmit the call sign associated with a particular one of said plurality of transmission frequencies.

17. A mobile radio system comprising:

at least two repeaters, wherein each of said repeaters includes:

a receiver for receiving a transmission at a first frequency;

a transmitter for transmitting said transmission at a second frequency displaced a fixed amount from said first frequency;

a frequency control circuit;

a microprocessor coupled to said frequency control circuit;

said microprocessor including memory, wherein a table of available frequencies for transmission and for reception is stored in said memory and said microprocessor causes said frequency control circuit to select one of said frequencies under software control;

wherein the microprocessor in one repeater is coupled to the microprocessor in each other repeater for sharing data on frequency allocation among the microprocessors.

18. The system as set forth in claim 17 wherein at least one microprocessor includes a memory containing a table of call signs corresponding to said available frequencies and wherein each repeater automatically identifies itself with the call sign corresponding to the frequency of transmission then in use by the repeater.

* * * * *